(12) United States Patent
Escott et al.

(10) Patent No.: US 9,119,062 B2
(45) Date of Patent: Aug. 25, 2015

(54) METHODS AND APPARATUS FOR PROVIDING ADDITIONAL SECURITY FOR COMMUNICATION OF SENSITIVE INFORMATION

(71) Applicant: QUALCOMM Incorporated, San Diego, CA (US)

(72) Inventors: Adrian Edward Escott, Reading (GB); Michaela Vanderveen, Tracy, CA (US); Alexander W. Dent, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 13/656,112

(22) Filed: Oct. 19, 2012

(65) Prior Publication Data

US 2014/0112475 A1    Apr. 24, 2014

(51) Int. Cl.
*H04L 9/00* (2006.01)
*H04W 12/02* (2009.01)
*H04L 29/06* (2006.01)
*H04W 12/04* (2009.01)
*H04W 76/02* (2009.01)

(52) U.S. Cl.
CPC ........... *H04W 12/02* (2013.01); *H04L 63/0457* (2013.01); *H04W 12/04* (2013.01); *H04W 76/023* (2013.01)

(58) Field of Classification Search
CPC ..... H04W 12/02; H04W 12/06; H04W 12/04; H04W 76/023; H04L 9/08; H04L 63/0457
USPC ........................................................ 380/270
See application file for complete search history.

(56) References Cited

U.S. PATENT DOCUMENTS

| 2008/0137853 | A1  | 6/2008 | Mizikovsky et al. |
| 2008/0188200 | A1  | 8/2008 | Forsberg |
| 2009/0025060 | A1* | 1/2009 | Mukherjee et al. ............... 726/3 |
| 2009/0111423 | A1* | 4/2009 | Somasundaram et al. ..... 455/410 |

(Continued)

FOREIGN PATENT DOCUMENTS

EP    1858193 A1    11/2007

OTHER PUBLICATIONS

International Search Report and Written Opinion—PCT/US2013/065735—ISA/EPO—Dec. 17, 2013.

(Continued)

*Primary Examiner* — Kambiz Zand
*Assistant Examiner* — Aubrey Wyszynski
(74) *Attorney, Agent, or Firm* — James K. O'Hare

(57) ABSTRACT

A method, an apparatus, and a computer program product for wireless communication are provided in connection with providing additional security for communication of sensitive information within a LTE based WWAN. In one example, a communications device is equipped to generate a keystream based on a mobility management entity-user equipment (MME-UE) key, a non-access stratum (NAS) message count value, and a contextual string associated with an informational element, and the contextual information, and cryptographically process the informational element using the generated keystream. In such an example, the communications device may be a UE, a MME, etc.

60 Claims, 12 Drawing Sheets

(56) References Cited

U.S. PATENT DOCUMENTS

| | | | |
|---|---|---|---|
| 2009/0111428 A1* | 4/2009 | Blommaert et al. | 455/411 |
| 2009/0323927 A1* | 12/2009 | Schneider | 380/28 |
| 2010/0316223 A1* | 12/2010 | Blom et al. | 380/278 |
| 2012/0140731 A1* | 6/2012 | Drapkin et al. | 370/331 |
| 2013/0067430 A1* | 3/2013 | Mayer-Ullmann | 717/106 |

OTHER PUBLICATIONS

Menezes, et al., "Handbook of Applied Cryptography", 1997, CRC Press LLC, USA, XP002717315, p. 397-p. 399, p. 490-p. 492, p. 498-p. 499.

Tsay J.K., et al., "A Vulnerability in the UMTS and LTE Authentication and Key Agreement Protocols," Oct. 17, 2012, pp. 65-76.

* cited by examiner

METHODS AND APPARATUS FOR PROVIDING ADDITIONAL SECURITY FOR COMMUNICATION OF SENSITIVE INFORMATION

BACKGROUND

1. Field

The present disclosure relates generally to communication systems, and more particularly, to providing a secure structure for communication of sensitive information, such as a key, in a Long Term Evolution (LTE) based wireless wide area network (WWAN).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. LTE may support direct device-to-device (D2D) (peer-to-peer) communication.

Many devices may be operable in a cellular network. When a first device detects another device, the first device may attempt to communicate directly with the device of interest. Serving mobility management entities (MMES) may be used to establish a D2D communication link between the devices. No functionality exists within the WWAN that allows the two devices that are attached to an LTE network to perform secure D2D communications where there is no key in common Additionally, current LTE NAS security procedures allow the use of integrity protection with a 32 bit MAC and with optional ciphering (e.g., ciphering may be optionally set to on or off for all messages) after the establishment of a security context. Even when the ciphering option is selected, the initial message (i.e. the first message sent by the UE when coming out of idle) is sent with only integrity. While the LTE NAS security procedures may provide suitable protection for messages and data related to the network access, the procedures may not be strong enough to protect other types of data (e.g., a key or secret material used to generate a key for secure D2D communications).

As the demand for D2D communication increases, there exists a need for methods/apparatuses for providing additional security for communication of sensitive information within LTE while minimizing use of WWAN resources.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with providing additional security for communication of sensitive information within a LTE based WWAN. In one example, a communications device is equipped to generate a keystream based on a mobility management entity-user equipment (MME-UE) key, a non-access stratum (NAS) message count value, and a contextual string associated with an informational element, and the contextual information, and cryptographically process the informational element using the generated keystream. In such an example, the communications device may be a UE, a MME, etc.

According to related aspects, a method for providing additional security for communication of sensitive information within a LTE based WWAN is provided. The method can include generating a keystream based on a MME-UE key, a NAS message count value, and a contextual string associated with an informational element. Moreover, the method may include cryptographically processing the informational element using the generated keystream.

Another aspect relates to a communications apparatus configured to provide additional security for communication of sensitive information within a LTE based WWAN. The communications apparatus can include means for generating a keystream based on a MME-UE key, a NAS message count value, and a contextual string associated with an informational element. Moreover, the communications apparatus can include means for cryptographically processing the informational element using the generated keystream.

Another aspect relates to a communications apparatus. The apparatus can include a processing system configured to generate a keystream based on a MME-UE key, a NAS message count value, and a contextual string associated with an informational element. Moreover, the processing system may further be configured to cryptographically process the informational element using the generated keystream.

Still another aspect relates to a computer program product, which can have a computer-readable medium including code for generating a keystream based on a MME-UE key, a NAS message count value, and a contextual string associated with an informational element. Moreover, the computer-readable medium can include code for cryptographically processing the informational element using the generated keystream.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
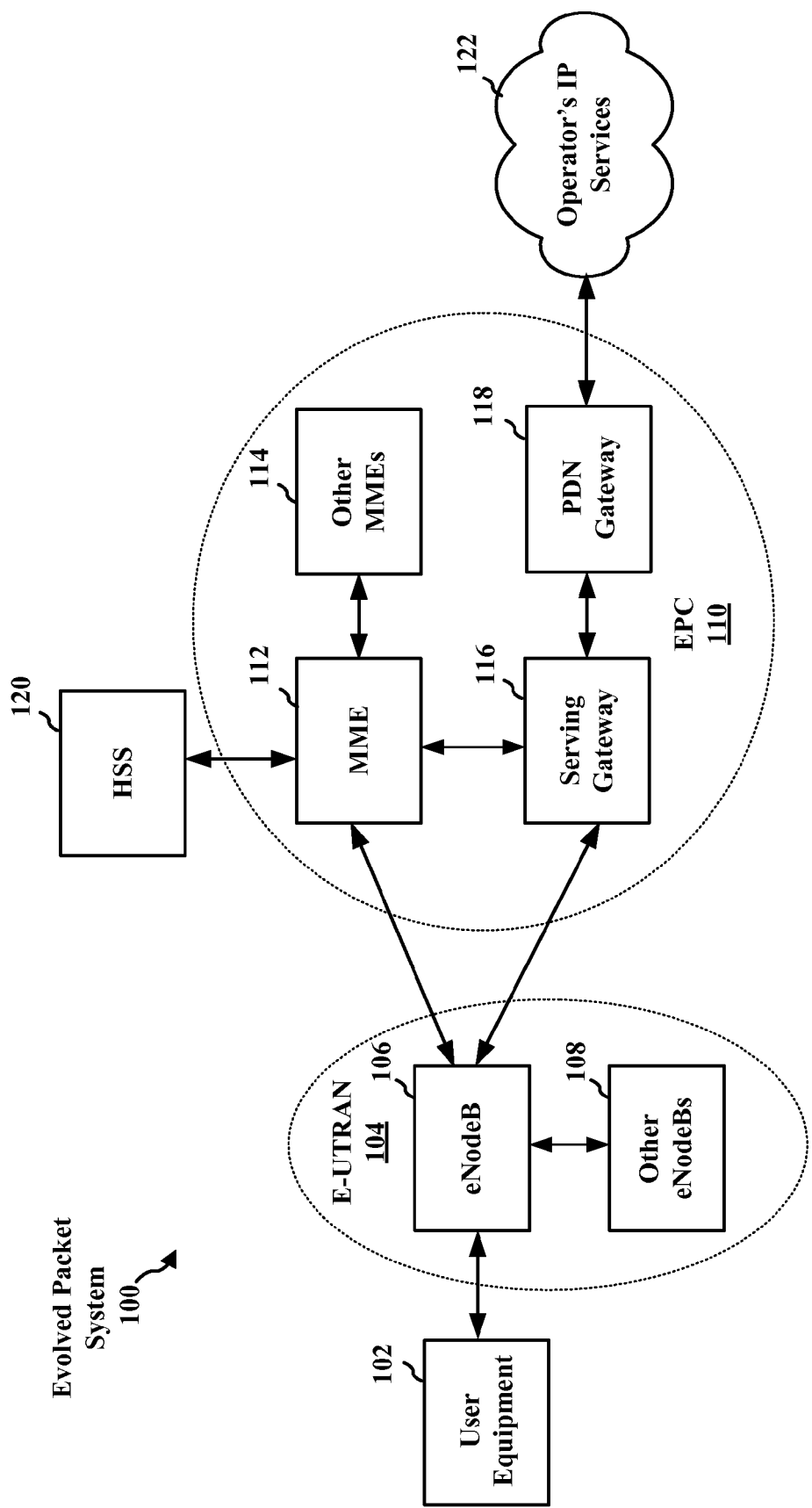
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
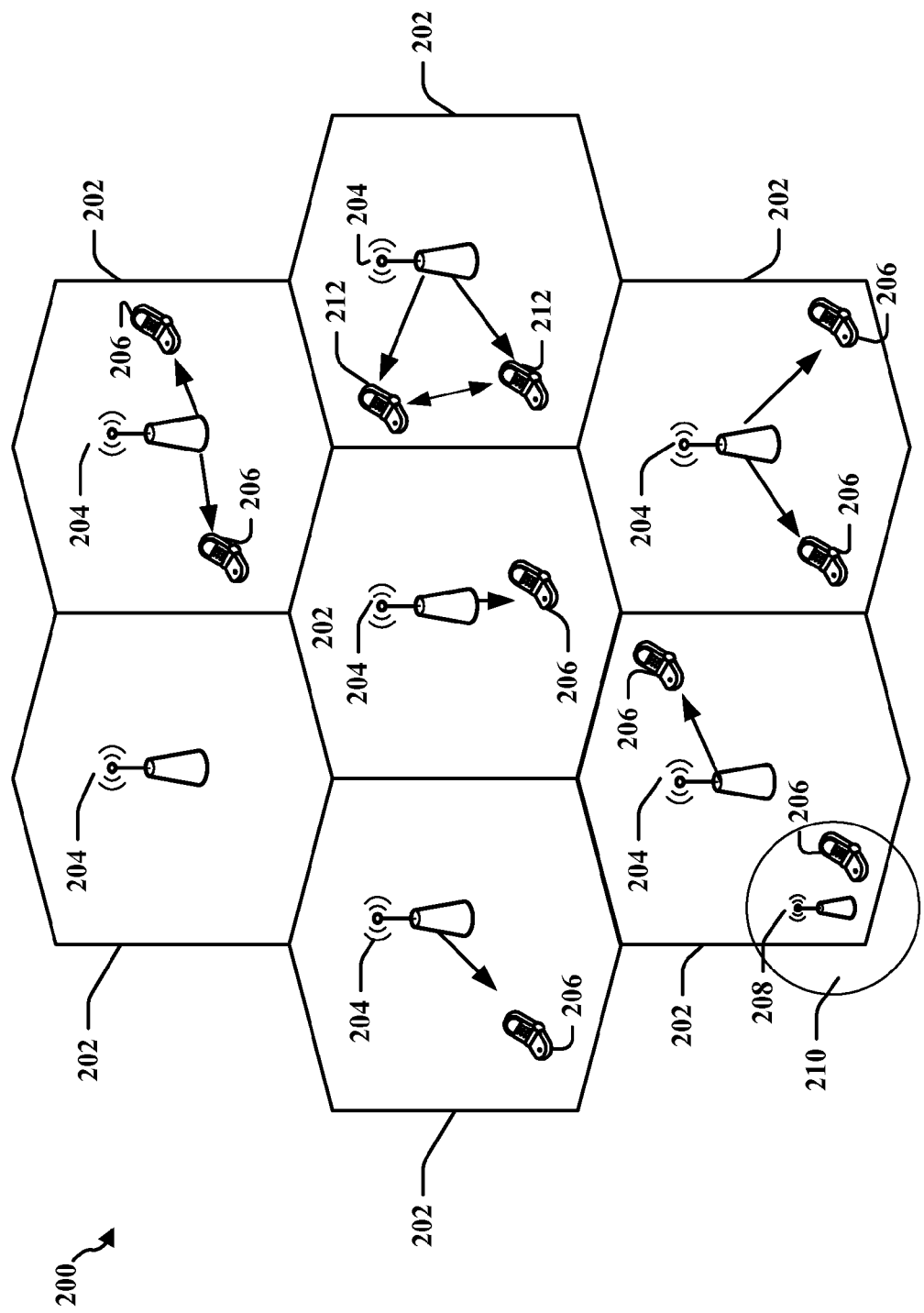
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206, 212 in the cells 202. Some of the UEs 212 may be in device-to-device communication. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 3:
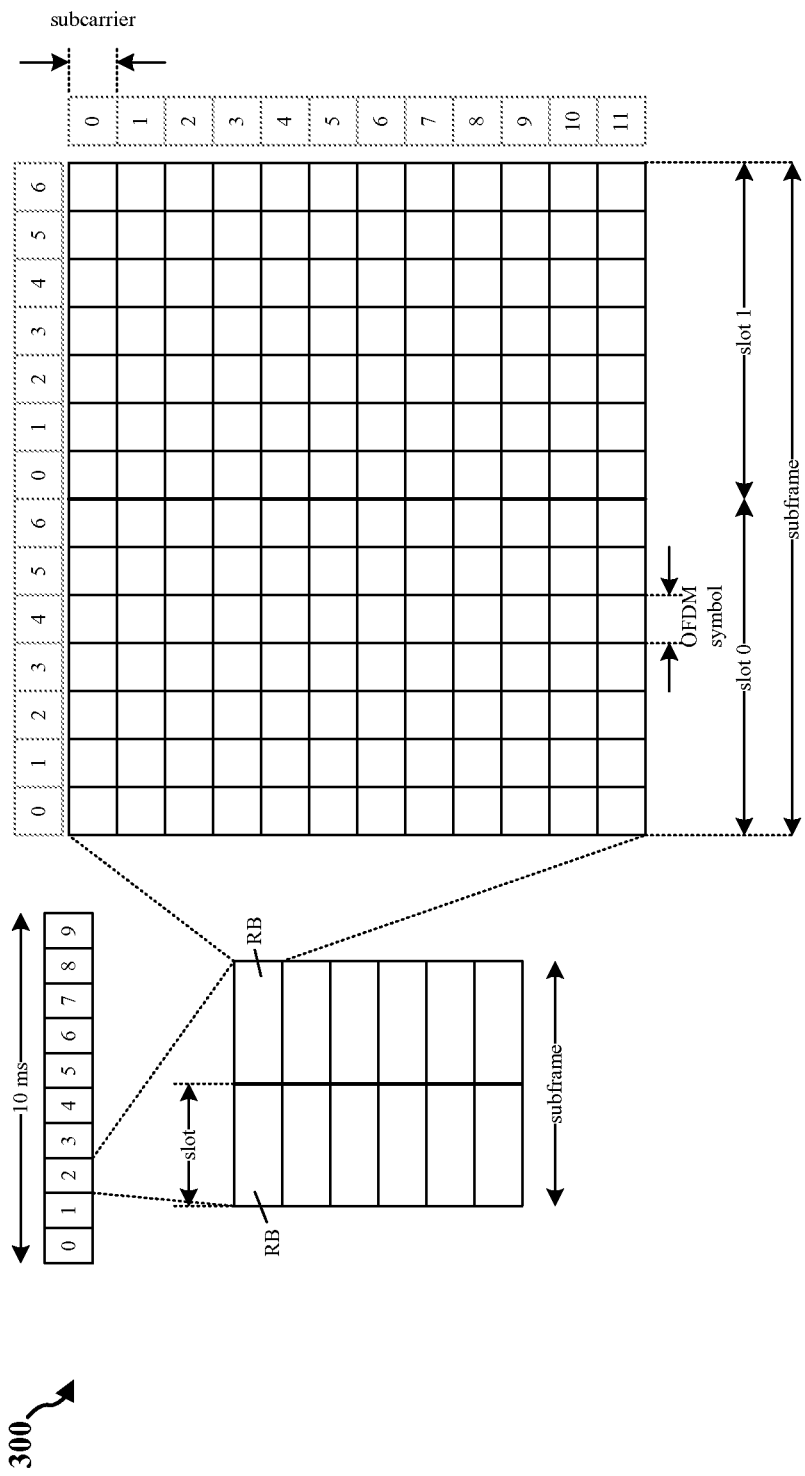
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. A physical DL control channel (PDCCH), a physical DL shared channel (PDSCH), and other channels may be mapped to the resource elements.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
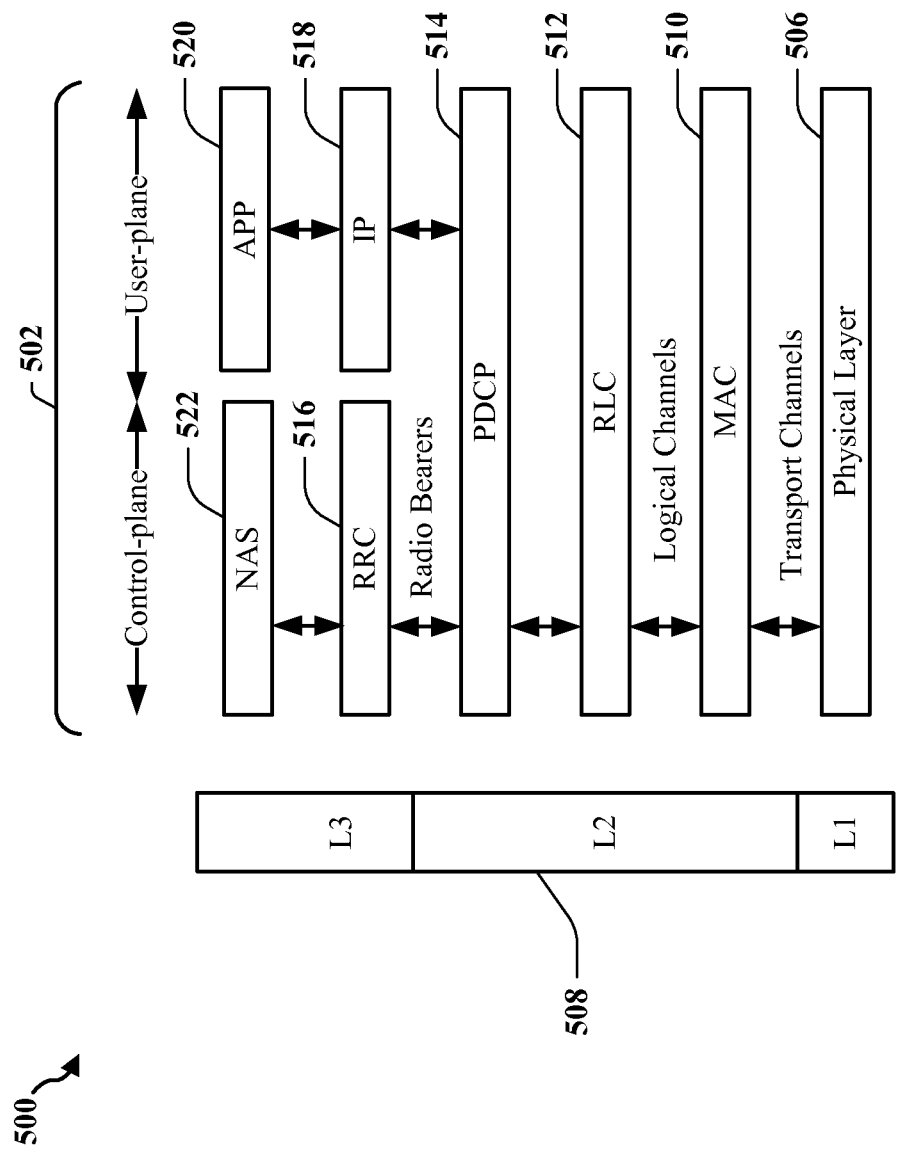
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the 502 UE and the eNB is shown with three layers: Layer 1, Layer 2, and Layer 3. Communication 522 of data/signaling may occur between UE 502 and an eNB across the three layers. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 and NAS sublayer 522 in Layer 3 (L3 layer). The RRC sublayer 516 is responsible for obtaining radio resources (i.e., radio bearers) and for configuring the lower layers using RRC signaling between the eNB and the UE 502. The NAS sublayer 522 is responsible for supporting session management procedures to establish and maintain IP connectivity for the UE 502 and support control plane communications between UE 502 and a MME at the radio interface. The NAS sublayer 522 provides protocols that support of mobility between the UE 502 and a packet data network gateway (PDN GW). NAS sublayer 522 protocols may be used to perform EPS bearer management, authentication, EPS Connection Management (ECM)-IDLE mobility handling, Paging origination in ECM-IDLE, security control, etc.

The user plane also includes an internet protocol (IP) sublayer 518 and an application sublayer 520. The IP sublayer 518 and application sublayer 520 are responsible for supporting communication of application data between the eNB 504 and the UE 502.

Figure 6:
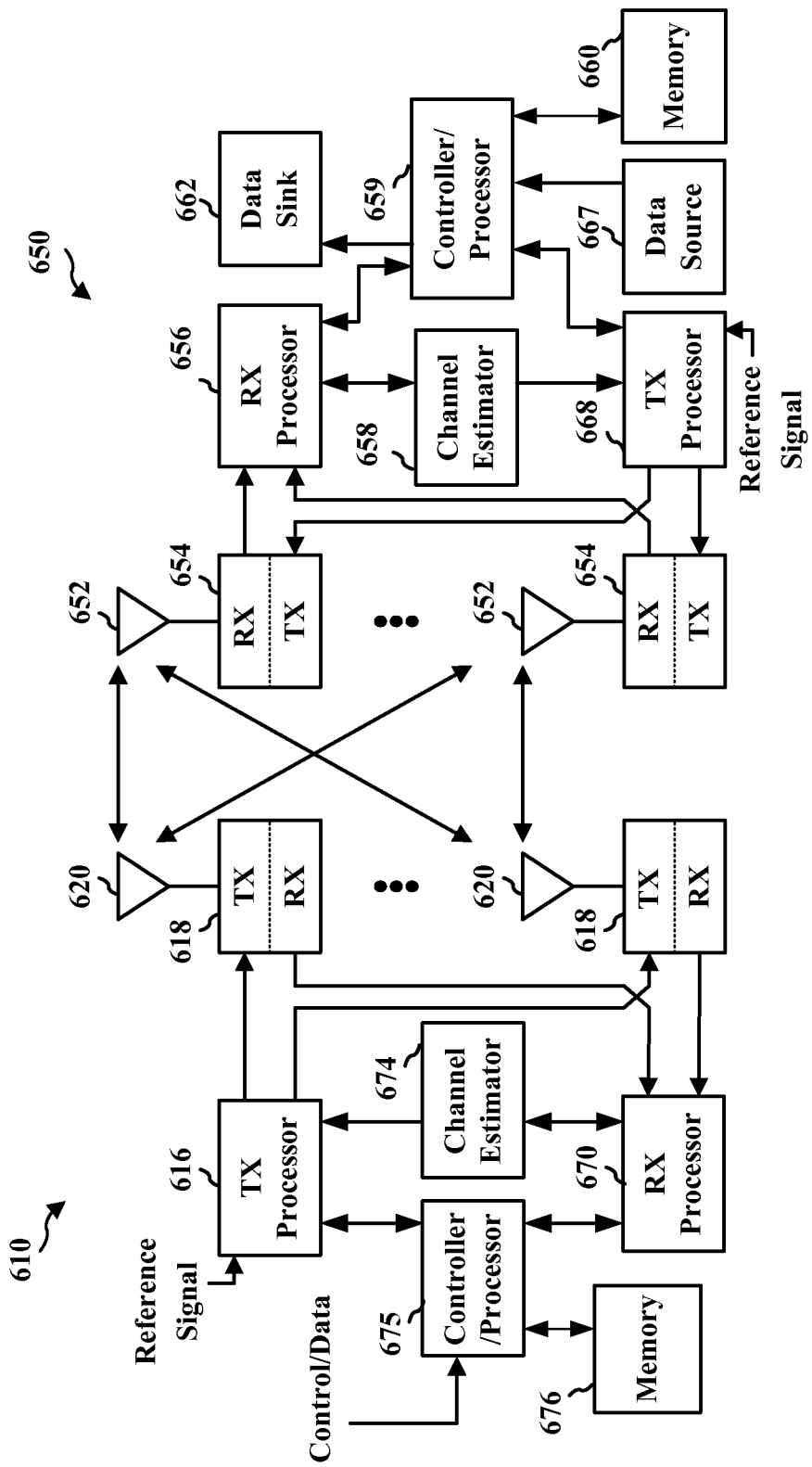
FIG. 6 is a diagram illustrating an example of an evolved Node B and user equipment in an access network.

FIG. 6 is a block diagram of a WAN entity (e.g., eNB, MME, etc.) 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the WAN entity 610. These soft decisions may be based on channel estimates computed by the channel estimator 658. The soft decisions are then decoded and deinterleaved to recover the data and control signals that were originally transmitted by the WAN entity 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the WAN entity 610, the controller/processor 659 implements the L2 layer for the user plane and the control plane by providing header compression, ciphering, packet segmentation and reordering, and multiplexing between logical and transport channels based on radio resource allocations by the WAN entity 610. The controller/processor 659 is also responsible for HARQ operations, retransmission of lost packets, and signaling to the WAN entity 610.

Channel estimates derived by a channel estimator 658 from a reference signal or feedback transmitted by the WAN entity 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the WAN entity 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
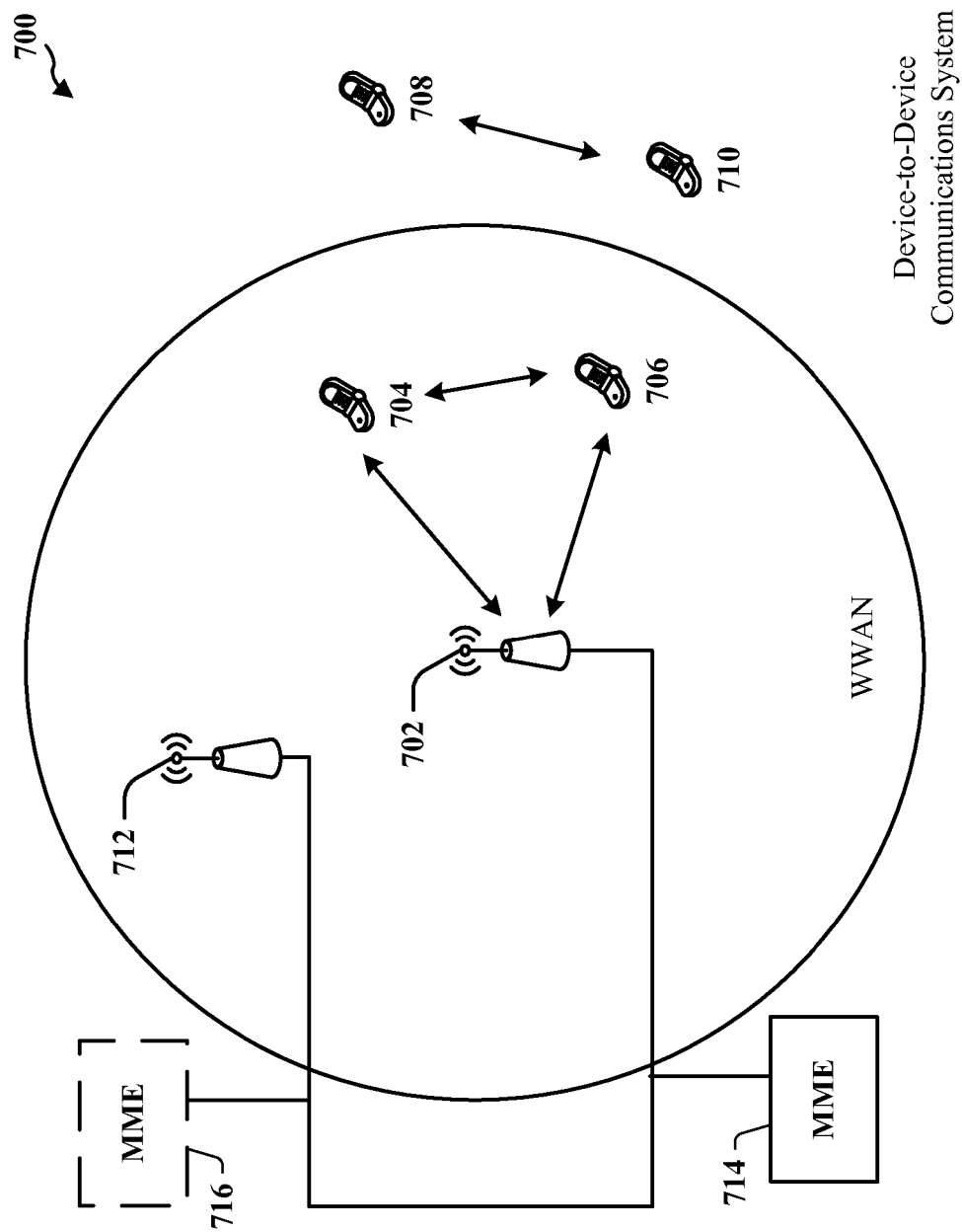
FIG. 7 is a diagram illustrating a device-to-device communications network.

FIG. 7 is a diagram of a device-to-device communications system 700. The device-to-device communications system 700 includes a plurality of wireless devices 704, 706, 708, 710, one or more base stations (eNodeBs 702, 712) and one or more MMEs (714, 716).

The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with base station 702 and/or base station 712, and some may do both. In another aspect, the WWAN may include multiple base stations (702, 712) that may provide a coordinated communications environment through connectivity provided via one or more network entities (e.g., MMEs 714, 716).

For example, as shown in FIG. 7, the wireless devices 708, 710 are in device-to-device communication and the wireless devices 704, 706 are in device-to-device communication. The wireless devices 704, 706 are also communicating with the base station 702.

In an operational aspect, device 704 and device 706 may perform secure D2D communications using keys generated through assistance from MME 714 and/or MME 716.

Figure 8:
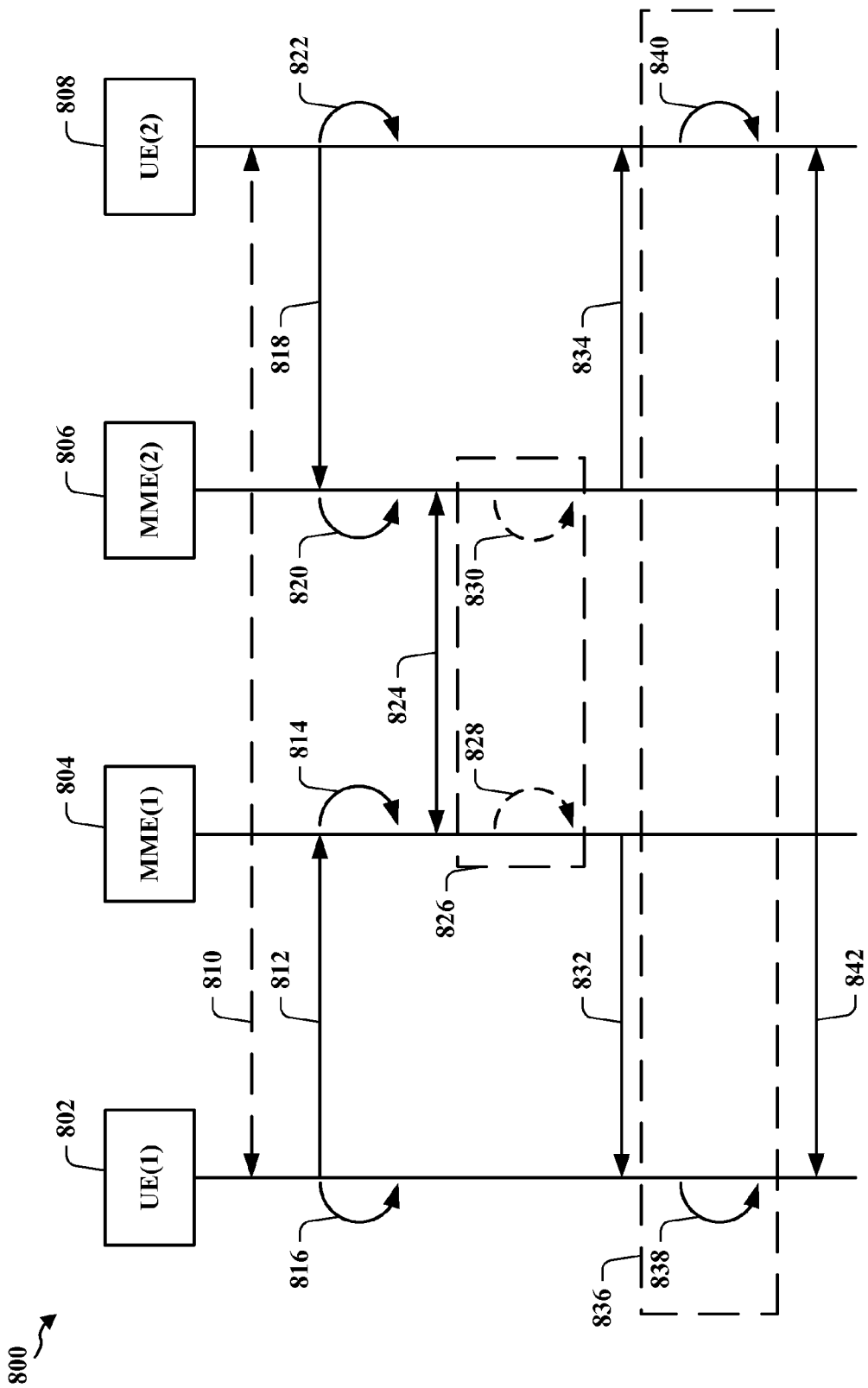
FIG. 8 is a call flow diagram illustrating a first method for secure device-to-device communications in a network.
Figure 9:
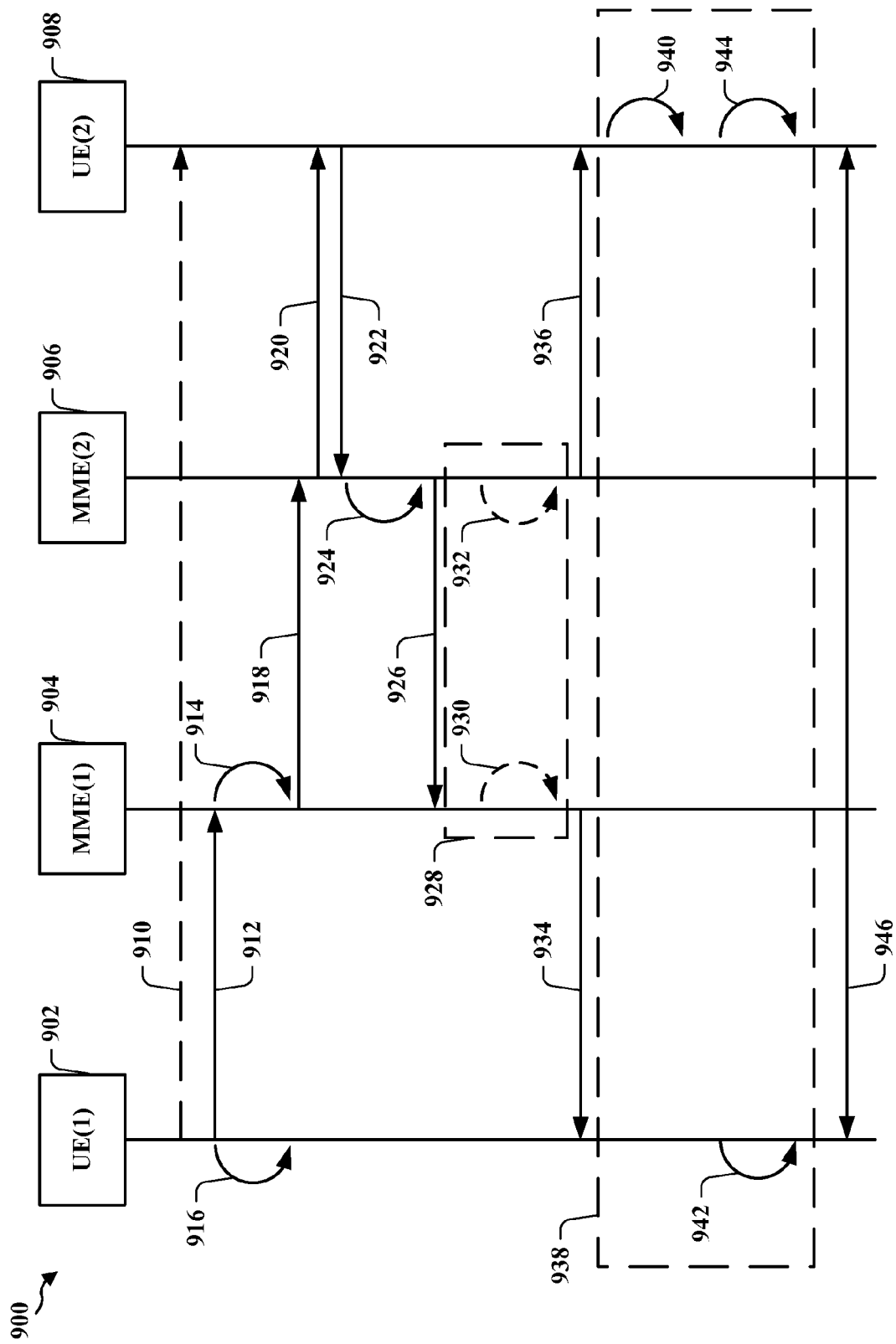
FIG. 9 is a call flow diagram illustrating a second method for secure device-to-device communications in a network.

FIGS. 8 and 9 illustrate call-flow diagrams illustrating various configurations in which one or more MME(s) may assist UEs with key generation. The call-flow diagrams presented in FIGS. 8 and 9 are provided as example implementations and one of ordinary skill in the art would understand that the subject matter described herein in not limited to the specific examples set forth in these figures.

FIG. 8 is a call flow diagram of a communications network 800 including a first UE 802 (UE(1)), a MME 804 (MME(1)) serving the first UE, a MME 806 (MME(2)) serving a second UE, and the second UE 808 (UE(2)). Although two MMEs are shown in communications network 800, one of ordinary skill in the art would recognize that the method described in the call flow diagram may be performed by any number of MMEs, alone or in combination. As further described with reference to FIG. 10, informational elements included in one or more of the NAS messages described herein may be cryptographically processed (encrypted/decrypted) using a keystream. In such an aspect, the keystream may be generated based on a MME-UE key, a NAS message count value, and a contextual string associated with the information element.

At act 810, UE(1) 802 and UE(2) 808 may decide to attempt to establish a secure D2D communications link. At act 812, UE(1) 802 may send a NAS message to MME(1) 804 indicating that an intent to establish a shared key with UE(2) 808. This NAS message may include the first UE key. In another aspect, at act 814, MME(1) 804 may calculate a first UE key from values known to MME(1) 804 and UE(1) 802 and at act 816, UE(1) 802 may calculate the first UE Key from the same values.

Similarly, at act 818, UE(2) 808 may send a NAS message to MME(2) 806 indicating intent to establish a shared key with UE(1) 802. This NAS message may contain a second UE key. In another aspect, at act 820, MME(2) may calculate the second UE key from values known to MME(2) 806 and UE(2) 808 and at act 822, UE(2) 808 may calculate the second UE Key from the same values.

At act 824, where there are multiple MMEs as described in the depicted call flow diagram, MME(1) may provide MME (2) with the first UE key and an identifier for UE(1) 802. Further, MME(2) may provide MME(1) with the second UE key and an identifier for UE(2) 808.

An optional aspect is described in box 826. At act 828, MME(1) 804 may calculate a final UE key from the first UE Key and the second UE Key. Further, at act 830, MME(2) 806 may also calculate the final UE key from the first UE key and the second UE key. In another aspect, one of the MMEs (804, 806) may calculate the final UE key and send the final UE key to the other MME.

At act 832, MME(1) 804 may send at least confirmation that the second UE(2) 808 was contacted. In an aspect, MME (1) 804 may send the second UE key to the first UE(1) 802. In another aspect, MME(1) 804 may send the final UE key to the first UE. Similarly, at act 834, MME(2) 806 may send the first UE key to the second UE(2) 808. In an aspect, MME(2) 806 may send the final UE key to the second UE(2) 808. In an aspect in which sensitive information (e.g., a first UE key, a second UE key, a final UE key, etc.) is transmitted, additional security procedures may be implemented. Further discussion of such procedures is provided with reference to FIG. 10.

Another optional aspect is described in block 836. At act 838, UE(1) 802 may calculate a final UE key based at least on the first UE key. In another aspect, the UE(1) 802 may calculate the final UE key based on the first UE key and the second UE key. Similarly, at act 840, UE(2) 808 may calculate the final UE key based on the first UE key and the second UE key.

Thereafter, at act 842, UE(1) 802 and UE(2) 808 may perform secure D2D communications.

FIG. 9 is another call flow diagram of a communications network 900 including a first UE 902 (UE(1)), a MME 904 (MME(1)) serving the first UE, a MME 906 (MME(2)) serving a second UE, and the second UE 908 (UE(2)). Although two MMEs are shown in communications network 900, one of ordinary skill in the art would recognize that the method described in the call flow diagram may be performed by any number of MMEs, alone or in combination. As further described with reference to FIG. 10, informational elements included in one or more of the NAS messages described herein may be cryptographically processed (encrypted/decrypted) using a keystream. In such an aspect, the keystream may be generated based on a MME-UE key, a NAS message count value, and a contextual string associated with the information element.

At act 910, UE(1) 902 may detect the presence of UE(2) 908 and may decide to attempt to establish a secure D2D communications link with UE(2) 908. At act 912, UE(1) 902 may send a NAS message to MME(1) 904 indicating that an intent to establish a shared key with UE(2) 908. This message may include a first UE key. In another aspect, at act 914, MME(1) 904 may calculate the first UE key from values known to MME(1) 904 and UE(1) 902, and at act 916, UE(1) 902 may calculate the first UE Key from the same values.

At act 918, MME(1) 904 may provide MME(2) with the first UE key and a second UE(2) 908 identifier. At act 920, MME(2) 906 may page UE(2) 908, and at act 922, UE(2) may respond to the page. In an aspect, UE(2) 908 may respond with a NAS message which may contain a second UE key.

In another aspect, at act 924, MME(2) 906 may calculate a second UE key from values known to MME(2) 906 and UE(2) 908. At act 926, the second UE key may be sent from MME(2) 906 to MME(1) 904.

An optional aspect is described in box 928. At act 930, MME(1) 904 may calculate a final UE key from the first UE Key and the second UE Key. Further, at act 932, MME(2) 906 may also calculate the final UE key from the first UE key and the second UE key. In another aspect, one of the MMEs (904, 906) may calculate the final UE key and send the final UE key to the other MME.

At act 934, MME(1) 904 may send at least confirmation that the second UE(2) 908 was contacted. In an aspect, MME (1) 904 may send the second UE key to the first UE(1) 902. In another aspect, MME(1) 904 may send the final UE key to the first UE. Similarly, at act 936, MME(2) 906 may send the first UE key to the second UE(2) 908. In an aspect, MME(2) 906 may send the final UE key to the second UE(2) 908. In an aspect in which sensitive information (e.g., a first UE key, a second UE key, a final UE key, etc.) is transmitted, additional security procedures may be implemented. Further discussion of such procedures is provided with reference to FIG. 10.

Another optional aspect is described in block 938. At act 940, UE(2) 908 may calculate a second UE key from values known to MME(2) 906 and UE(2) 908. At act 940, UE(1) 902 may calculate a final UE key based at least on the first UE key. In another aspect, the UE(1) 902 may calculate the final UE key based on the first UE key and the second UE key. Similarly, at act 944, UE(2) 908 may calculate the final UE key based on the first UE key and the second UE key.

Thereafter, at act 946, UE(1) 902 and UE(2) 908 may perform secure D2D communications.

Figure 10:
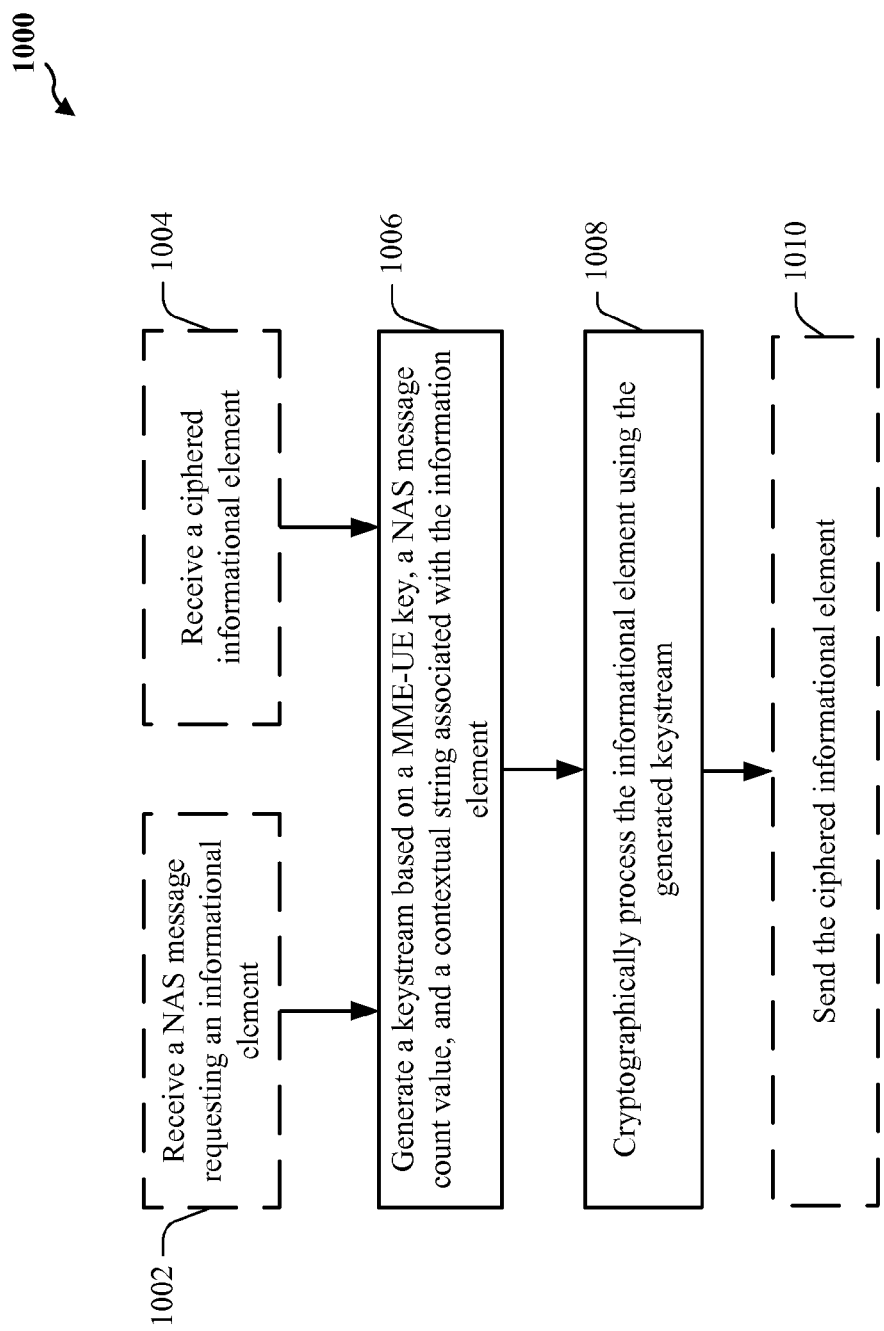
FIG. 10 is a flow chart of a first method of wireless communication.

FIG. 10 illustrates various a methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 10 is a flow chart 1000 of a first method of wireless communication. The method may be performed by a UE. In another aspect, the method may be performed by a MME.

In another aspect, the contextual information may also include a radio network temporary identifier (RNTI) of the second UE, an expression identifier, a service identifier, a transaction identifier, etc. In an optional aspect, at block 1002, an entity may receive a NAS message indicating that an informational element has been requested. In an aspect, the informational element may be a key, such as a first UE key, a second UE key, a final UE key, etc.

In another optional aspect, at block 1004, at an entity may receive the informational element from another entity (e.g., UE, MME, etc.) In another aspect, the informational element has been ciphered by the transmitting entity. In another aspect, the informational element may be received using a NAS message. In such an aspect, the NAS message may indicate a count value. Where the receiving entity is a UE, the count value may be a downlink count value. Where the receiving entity is an MME, the count value may be an uplink count value.

At block 1006, the entity may generate a keystream to use as a cipher for the informational element. In an aspect, the keystream may be based on a MME-UE key, a NAS message count value, and a contextual stream associated with the informational element. In such an aspect, the MME-UE key may be an access security management entity (ASME) key (K_ASME) as defined in the LTE environment. Further, in such an aspect, the NAS message count value may be a NAS message count value associated with the received NAS message, a NAS message count value associated with a NAS message to be used to transmit the informational element, etc. Still further, the contextual string may include information associated with an entity transmitting the informational element, an entity receiving the informational element, a third entity known to the transmitting and receiving entities, etc. In such an aspect, the information element may include an entity identifier such as but not limited to, a radio network temporary identifier (RNTI), an expression identifier, a service identifier, a transaction identifier, a MME identifier, etc., or any combination thereof. In another aspect, the contextual string may include information associated with a type of data included in the informational element. For example, the data type may be a key, user information, etc. In an aspect, the length of the generated keystream may be based on a length of the informational element. In another aspect, the length of the generated keystream may be a configurable constant value.

At block 1008, the entity may cryptographically process the informational element using the generated keystream. In an aspect in which a ciphered information element is received, the entity may decipher the informational element using the generated keystream. In an aspect, the ciphering may include XORing the keystream directly over the informational element. In an aspect in which the entity is ciphering the informational element for transmission, a portion of the generated keystream may be used as a key in the ciphering process.

In an optional aspect, at block 1010, the informational element may be sent using a NAS message. In an aspect in which the informational element was requested, then the informational element may be sent to the requesting entity and/or a third entity indicated by the requesting entity. In another aspect, the informational element may be sent using encryption available through LTE NAS procedures.

As such, the entity may communicate data using an informational element with added security without use of new information elements.

Figure 11:
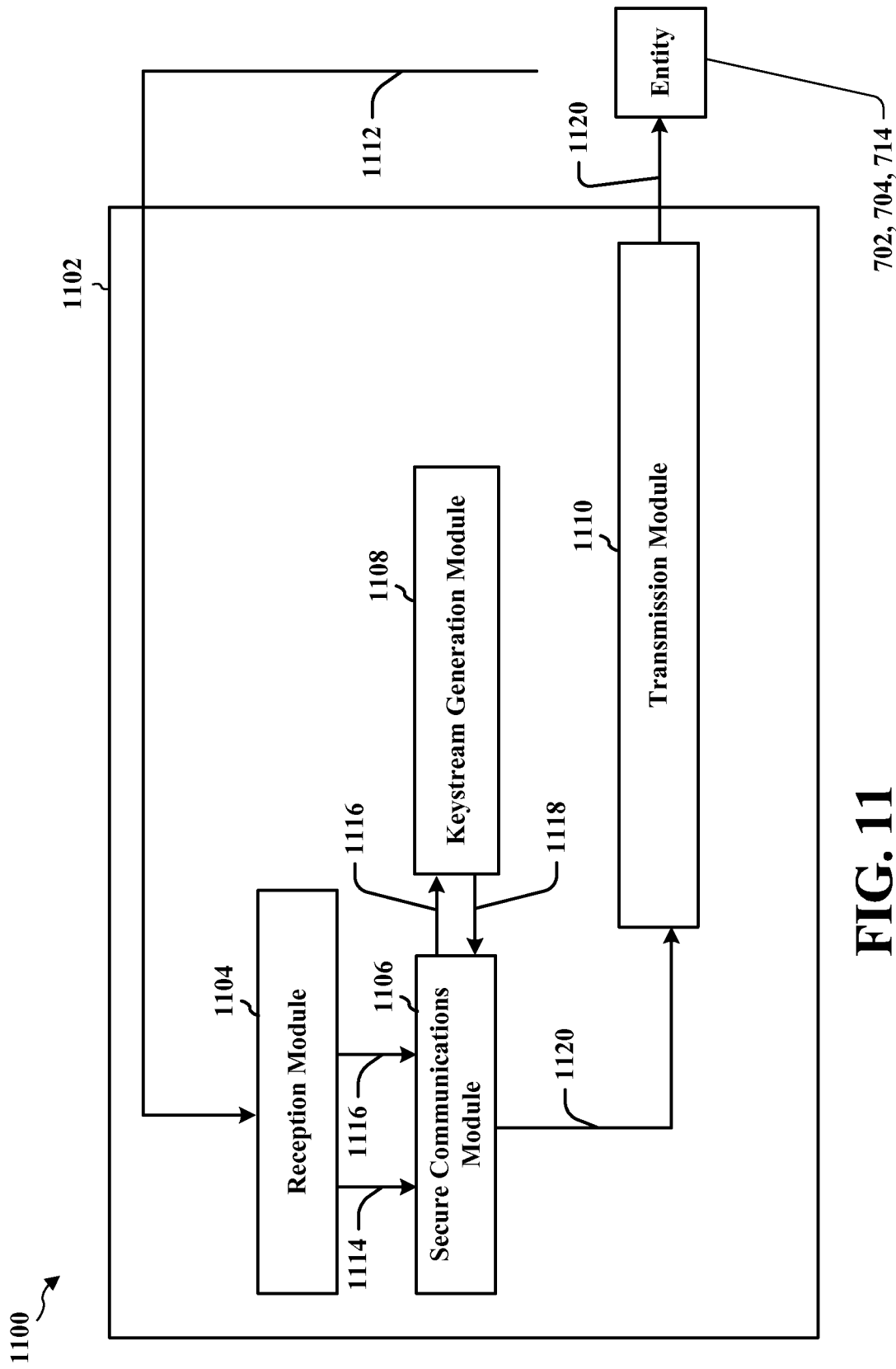
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a UE. In another aspect, the apparatus may be a MME.

The apparatus 1102 includes a reception module 1104 that may receive a message 1112 from another entity (e.g., UE 704, eNodeB 702, MME 714, etc.). In an aspect, the message 1112 may indicate a NAS message count value 1116, an informational element 1114, a request for an informational element, etc. In an aspect in which the apparatus 1102 is a UE 702, the NAS message count value may be a downlink count value. In an aspect in which the apparatus 1102 is an MME, the NAS message count value 1116 may be an uplink count value.

Apparatus 1102 may further include secure communications module 1106 and keystream generation module 1108. In an aspect, secure communications module may provide the NAS message count value 1116 to keystream generate module 1108 for cryptographic processing. Keystream generation module 1108 may generate a keystream 1118 based on a MME-first UE key, the NAS message count value 116, and a contextual string associated with an informational element. In an aspect, the NAS message count value used for keystream 1118 generation may be associated with the received message 1112 and/or associated with a NAS message 1120 used to transmit a ciphered informational element. The contextual string may include information associated with an entity transmitting the informational element, an entity receiving the informational element, a third entity known to the transmitting and receiving entities, etc. In such an aspect, the information element 1114 may include an entity identifier such as but not limited to, a radio network temporary identifier (RNTI), an expression identifier, a service identifier, a transaction identifier, a MME identifier, etc., or any combination thereof. In another aspect, the contextual string may include information associated with a type of data included in the informational element. For example, the data type may be a key, user information, etc. In an aspect, the length of the keystream 1118 may be based on a length of the informational element. In another aspect, the length of the keystream 1118 may be a configurable constant value.

Secure communications module 1106 may use the keystream to cryptographically process the informational element. In an aspect in which the received message 1112 included a ciphered informational element, secure communications 1106 may use the keystream to decipher the received ciphered informational element. In an aspect, in which the received message 1112 included a request for an informational element, secure communications module 1106 may obtain the requested informational element and cipher it using the keystream 1118 to generate a ciphered informational element 1120 for transmission by transmission module 1110.

The apparatus may include additional modules that perform each of the steps of the algorithm in the aforementioned flow charts of FIG. 10. As such, each step in the aforementioned flow charts of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
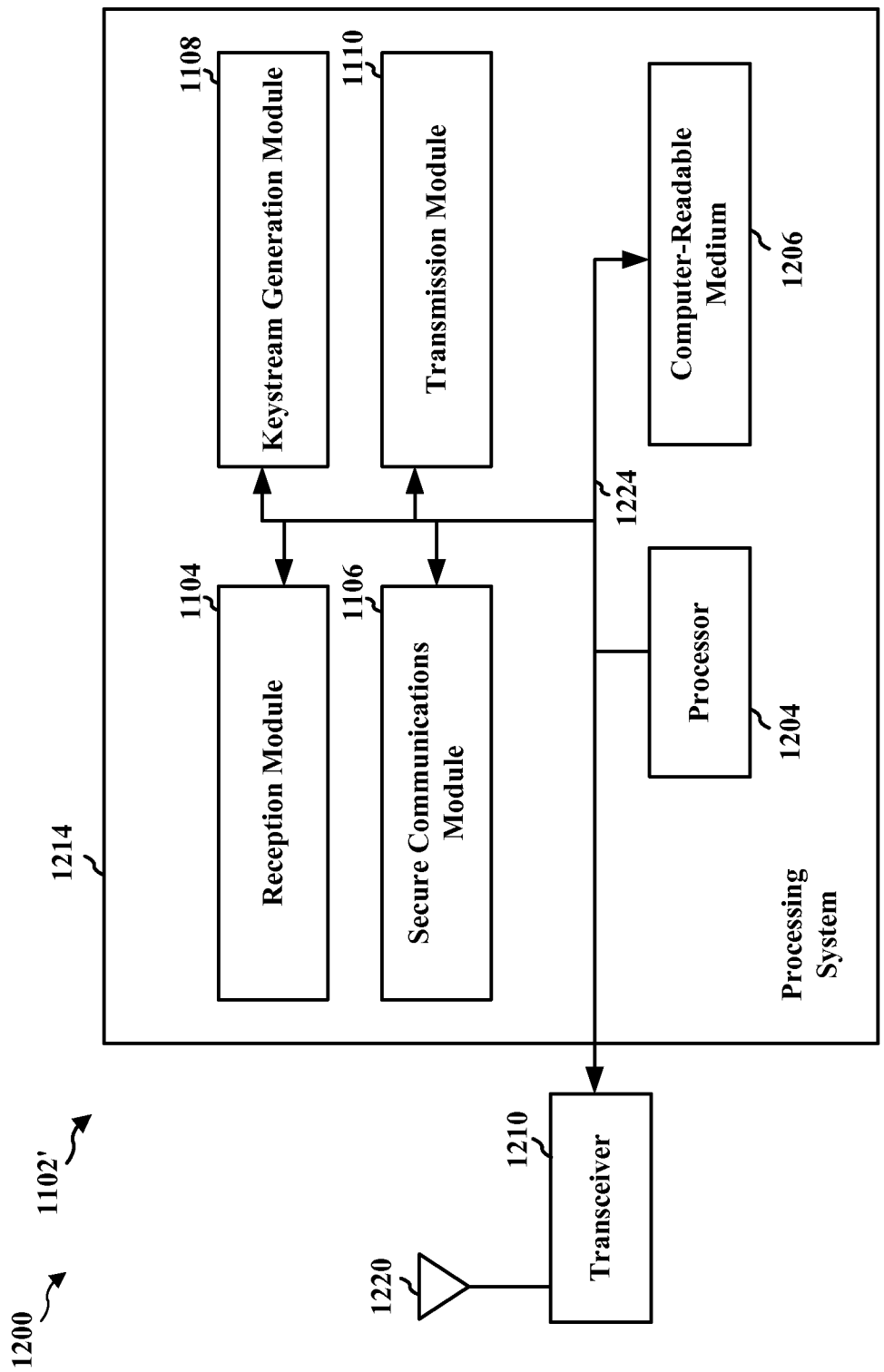
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, and the computer-readable medium 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The processing system 1214 includes a processor 1204 coupled to a computer-readable medium 1206. The processor 1204 is responsible for general processing, including the execution of software stored on the computer-readable medium 1206. The software, when executed by the processor 1204, causes the processing system 1214 to perform the various functions described supra for any particular apparatus. The computer-readable medium 1206 may also be used for storing data that is manipulated by the processor 1204 when executing software. The processing system further includes at least one of the modules 1104, 1106, 1108, and 1110. The modules may be software modules running in the processor 1204, resident/stored in the computer readable medium 1206, one or more hardware modules coupled to the processor 1204, or some combination thereof. The processing system 1214 may be a component of the UE 650 and may include the memory 660 and/or at least one of the TX processor 668, the RX processor 670, and the controller/processor 659. In another aspect, the processing system 1214 may be a component of the WAN entity 610 (e.g., MME) and may include the memory 676 and/or at least one of the TX processor 616, the RX processor 670, and the controller/processor 675.

In one configuration, the apparatus 1102/1102' for wireless communication includes means for generating a keystream based on a MME-UE key, a NAS message count value, and a contextual string associated with an informational element, and means for cryptographically processing the informational element using the generated keystream. In an aspect, the means for processing may be configured to cipher the informational element using the generated keystream. In such an aspect, the apparatus 1202/1202' may further include means for sending the ciphered informational element. In an aspect, the means for sending may be further configured to send the ciphered informational element using LTE NAS security procedures. In another aspect, the apparatus 1202/1202' may further include means for receiving the informational element. In such an aspect, the means for processing may be further configured to decipher the informational element using the generated keystream. In another aspect, the means for receiving may be configured to receive a NAS message that triggers the generation of the keystream.

The aforementioned means may be one or more of the aforementioned modules of the apparatus 1102 and/or the processing system 1214 of the apparatus 1102' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means. In another aspect, as described supra, the processing system 1214 may include the TX Processor 616, the RX Processor 670, and the controller/processor 675. As such, in one configuration, the aforementioned means may be the TX Processor 616, the RX Processor 670, and/or the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications, comprising:
generating a keystream based on a mobility management entity-user equipment (MME-UE) key, a non-access stratum (NAS) message count value, and a contextual string associated with an informational element; and
cryptographically processing the informational element using the generated keystream that is generated based on the contextual string associated with the informational element, the MME-UE key, and the NAS message count value wherein the informational element, associated with the contextual string used to generate the keystream, enables security for device-to-device (D2D) communications.

2. The method of claim 1, wherein the cryptographic processing comprises ciphering the informational element using the generated keystream; and further comprising sending the ciphered informational element.

3. The method of claim 1, further comprising receiving the informational element, and wherein the cryptographic processing comprises deciphering the informational element using the generated keystream.

4. The method of claim 1, wherein the MME-UE key comprises an access security management entity (ASME) key (K_ASME).

5. The method of claim 2, wherein the NAS message count value comprises a NAS message count associated with a NAS message used to transmit the ciphered informational element.

6. The method of claim 2, further comprising receiving a NAS message that triggers the generation of the keystream, and wherein the NAS message count value comprises a NAS message count value associated with the received NAS message.

7. The method of claim 3, wherein the receiving comprises receiving the informational element using a NAS message, and wherein the NAS message count value comprises a NAS message count associated with the received NAS message.

8. The method of claim 1, wherein the contextual string comprises information associated with of a type of data to be transmitted in the informational element.

9. The method of claim 1, wherein the contextual string comprises identifying information associated with at least one of: an entity sending the informational element, or an entity receiving the informational element.

10. The method of claim 1, wherein the informational element comprises at least one of: a radio network temporary identifier (RNTI), an expression identifier, a service identifier, a transaction identifier, a MME identifier, a first UE key, a second UE key, or a final UE key.

11. The method of claim 2, wherein the ciphering comprising XORing the keystream directly over the informational element.

12. The method of claim 1, wherein a length of the generated keystream is based on at least one of: a length of the informational element, or a constant value.

13. The method of claim 1, wherein a portion of the generated keystream is used as a key in a ciphering process.

14. The method of claim 2, wherein the sending further comprises sending the ciphered informational element using LTE NAS security procedures.

15. The method of claim 1, wherein the generating and processing are performed by at least one of a UE or a MME.

16. An apparatus for wireless communication, comprising:
means for generating a keystream based on a mobility management entity-user equipment (MME-UE) key, a non-access stratum (NAS) message count value, and a contextual string associated with an informational element; and
means for cryptographically processing the informational element using the generated keystream that is generated based on the contextual string associated with the informational element, the MME-UE key, and the NAS message count value wherein the informational element, associated with the contextual string used to generate the keystream, enables security for device-to-device (D2D) communications.

17. The apparatus of claim 16, wherein the means for cryptographic processing is configured to cipher the informational element using the generated keystream; and further comprising means for sending the ciphered informational element.

18. The apparatus of claim 16, further comprising means for receiving the informational element, and wherein the means for cryptographic processing is configured to decipher the informational element using the generated keystream.

19. The apparatus of claim 16, wherein the MME-UE key comprises an access security management entity (ASME) key (K_ASME).

20. The apparatus of claim 17, wherein the NAS message count value comprises a NAS message count associated with a NAS message used to transmit the ciphered informational element.

21. The apparatus of claim 17, further comprising means for receiving a NAS message that triggers the generation of the keystream, and wherein the NAS message count value comprises a NAS message count value associated with the received NAS message.

22. The apparatus of claim 18, wherein the means for receiving is configured to receive the informational element using a NAS message, and wherein the NAS message count value comprises a NAS message count associated with the received NAS message.

23. The apparatus of claim 16, wherein the contextual string comprises information associated with of a type of data to be transmitted in the informational element.

24. The apparatus of claim 16, wherein the contextual string comprises identifying information associated with at least one of: an entity sending the informational element, or an entity receiving the informational element.

25. The apparatus of claim 16, wherein the informational element comprises at least one of: a radio network temporary identifier (RNTI), an expression identifier, a service identifier, a transaction identifier, a MME identifier, a first UE key, a second UE key, or a final UE key.

26. The apparatus of claim 17, wherein the ciphering comprising XORing the keystream directly over the informational element.

27. The apparatus of claim 16, wherein a length of the generated keystream is based on at least one of: a length of the informational element, or a constant value.

28. The apparatus of claim 16, wherein a portion of the generated keystream is used as a key in a ciphering process.

29. The apparatus of claim 17, wherein the means for sending is configured to send the ciphered informational element using LTE NAS security procedures.

30. The apparatus of claim 16, wherein the means for generating and means for processing are performed by at least one of a UE or a MME.

31. An apparatus for wireless communication, comprising:
a processing system configured to:
generate a keystream based on a mobility management entity-user equipment (MME-UE) key, a non-access stratum (NAS) message count value, and a contextual string associated with an informational element; and
cryptographically process the informational element using the generated keystream that is generated based on the contextual string associated with the informational element, the MME-UE key, and the NAS message count value wherein the informational element, associated with the contextual string used to generate the keystream, enables security for device-to-device (D2D) communications.

32. The apparatus of claim 31, wherein the processing system is further configured to:
cipher the informational element using the generated keystream; and
send the ciphered informational element.

33. The apparatus of claim 31, wherein the processing system is further configured to:
receive the informational element; and
decipher the informational element using the generated keystream.

34. The apparatus of claim 31, wherein the MME-UE key comprises an access security management entity (ASME) key (K_ASME).

35. The apparatus of claim 32, wherein the NAS message count value comprises a NAS message count associated with a NAS message used to transmit the ciphered informational element.

36. The apparatus of claim 32, wherein the processing system is further configured to receive a NAS message that triggers the generation of the keystream, and wherein the NAS message count value comprises a NAS message count value associated with the received NAS message.

37. The apparatus of claim 33, wherein the receiving comprises receiving the informational element using a NAS message, and wherein the NAS message count value comprises a NAS message count associated with the received NAS message.

38. The apparatus of claim 31, wherein the contextual string comprises information associated with of a type of data to be transmitted in the informational element.

39. The apparatus of claim 31, wherein the contextual string comprises identifying information associated with at least one of: an entity sending the informational element, or an entity receiving the informational element.

40. The apparatus of claim 31, wherein the informational element comprises at least one of: a radio network temporary identifier (RNTI), an expression identifier, a service identifier, a transaction identifier, a MME identifier, a first UE key, a second UE key, or a final UE key.

41. The apparatus of claim 32, wherein the processing system is further configured to XOR the keystream directly over the informational element.

42. The apparatus of claim 31, wherein a length of the generated keystream is based on at least one of: a length of the informational element, or a constant value.

43. The apparatus of claim 31, wherein a portion of the generated keystream is used as a key in a ciphering process.

44. The apparatus of claim 32, wherein the processing system is further configured to send the ciphered informational element using LTE NAS security procedures.

45. The apparatus of claim 31, wherein the apparatus is at least one of a UE or a MME.

46. A computer program product, comprising:
a non-transitory computer-readable medium comprising code for:
generating a keystream based on a mobility management entity-user equipment (MME-UE) key, a non-access stratum (NAS) message count value, and a contextual string associated with an informational element; and
cryptographically processing the informational element using the generated keystream that is generated based on the contextual string associated with the informational element, the MME-UE key, and the NAS message count value wherein the informational element, associated with the contextual string used to generate the keystream, enables security for device-to-device (D2D) communications.

47. The computer program product of claim 46, wherein the computer-readable medium further comprises code for:
ciphering the informational element using the generated keystream; and
sending the ciphered informational element.

48. The computer program product of claim 46, wherein the computer-readable medium further comprises code for:
receiving the informational element; and
deciphering the informational element using the generated keystream.

49. The computer program product of claim 46, wherein the MME-UE key comprises an access security management entity (ASME) key (K_ASME).

50. The computer program product of claim 47, wherein the NAS message count value comprises a NAS message count associated with a NAS message used to transmit the ciphered informational element.

51. The computer program product of claim 47, wherein the computer-readable medium further comprises code for receiving a NAS message that triggers the generation of the keystream, and wherein the NAS message count value comprises a NAS message count value associated with the received NAS message.

52. The computer program product of claim 48, wherein the computer-readable medium further comprises code for receiving the informational element using a NAS message, and wherein the NAS message count value comprises a NAS message count associated with the received NAS message.

53. The computer program product of claim 46, wherein the contextual string comprises information associated with of a type of data to be transmitted in the informational element.

54. The computer program product of claim 46, wherein the contextual string comprises identifying information associated with at least one of: an entity sending the informational element, or an entity receiving the informational element.

55. The computer program product of claim 46, wherein the informational element comprises at least one of: a radio network temporary identifier (RNTI), an expression identifier, a service identifier, a transaction identifier, a MME identifier, a first UE key, a second UE key, or a final UE key.

56. The computer program product of claim 47, wherein the computer-readable medium further comprises code for XORing the keystream directly over the informational element.

57. The computer program product of claim 46, wherein a length of the generated keystream is based on at least one of: a length of the informational element, or a constant value.

58. The computer program product of claim 46, wherein a portion of the generated keystream is used as a key in a ciphering process.

59. The computer program product of claim 47, wherein the computer-readable medium further comprises code for sending the ciphered informational element using LTE NAS security procedures.

60. The computer program product of claim 46, wherein the code for generating and code for processing are performed by at least one of a UE or a MME.

* * * * *